United States Patent Office 2,878,282
Patented Mar. 17, 1959

2,878,282
PURIFICATION OF LYSINE

Norman L. Hause, West Chester, Pa., assignor to E. I. du Pont de Nemours and Company, Wilmington, Del., a corporation of Delaware No Drawing. Application February 19, 1957
Serial No. 641,030

5 Claims. (Cl. 260—534)

This invention relates to the purification of lysine and more particularly to the purification of lysine which has been racemized prior to the resolution thereof into its optically active components.

This application is a continuation-in-part of my pending application, Serial No. 567,734, filed February 27, 1956, and now abandoned.

Lysine synthesized from optically inactive materials is obtained in racemic form, i. e., a mixture of equal parts of the biologically active L-isomer and the biologically inactive D-isomer. For most purposes, e. g., for nutritional uses, the L-isomer is desired and ways have been devised for converting the racemic form or the D-form of lysine entirely, or substantially so, to L-lysine. Such methods involve resolving racemic lysine (or other mixtures of the D- and L-isomers) into its optically active components, racemizing the D-lysine fraction to give a mixture of D- and L-lysine, and repeating the resolution-racemization cycle until the desired conversion to L-lysine is effected. Lysine can be converted to its D-isomer by a similar procedure in which the L-lysine fraction from the resolution is racemized instead of the D-lysine fraction. However, for most purposes the desired conversion will be to the biologically active L-isomer.

Various methods have been proposed for resolving lysine involving reacting DL-lysine (or other mixtures of the D- and L-isomers) with an optically active resolving agent, e. g. camphoric or glutamic acid, to form a mixture of diastereoisomers which are fractionally crystallized from a suitable solvent. High conversions to the desired optically active isomer and rapid crystallization of that isomer from the resolution mixture are obviously of considerable practical importance in such methods. Generally, both the conversion and rate of crystallization are adversely affected by the presence in the resolution mixture of excessive amounts of impurities such as by-products formed in the racemization stage of the resolution-racemization cycle described above.

One of the most practical methods for racemizing lysine, e. g., in such a resolution-racemization cycle, is that described in Emmick et al. U. S. Patent 2,536,360, which involves heating an optically active isomer of lysine in combination with a cation-exchange material. It has been found, however, that lysine which has been repeatedly racemized by that method, or has been held on a cation-exchange resin for a long period of time at an elevated temperature, e. g., 100 to 230° C., gives a much lower conversion to the desired isomer (in a subsequent resolution) and at a substantially slower rate of crystallization, than does freshly synthesized DL-lysine. This is due to the formation during repeated racemizations of by-products which, though present in minor amounts, interfere with a subsequent resolution. One by-product which has been identified is alpha-amino-epsilon-caprolactam. A number of other by-product impurities which have not been identified have been found by paper chromatographic methods to be formed in significant amounts. All of them are difficult to separate from lysine by conventional methods, and their presence seriously interferes with the resolution of lysine.

It is an object of the invention to provide a method for purifying lysine containing impurities which interfere with its resolution, whereby such impurities are destroyed or rendered innocuous. Another object is to provide a method for treating lysine which contains by-product impurities formed during racemization by the method of Patent 2,536,360, whereby such impurities are transformed so as not to interfere with a subsequent resolution of the treated lysine. Still further objects of the invention will be apparent from the following description.

The objects of the invention are accomplished by treating lysine which contains by-product impurities formed during racemization by the method of the above patent, or by prolonged heating with a cation-exchange material, with a strong mineral acid at an elevated temperature for a time sufficiently long to transform such impurities to products which do not interfere with a subsequent resolution of the so-treated lysine.

It is not entirely clear what the action of the treatment with the strong mineral acid is upon such impurities but it seems likely that at least most of them are reconverted to lysine by the treatment. The identities of all of the interfering by-products have not been established but they apparently are amino compounds and their presence can be shown by paper chromatographic methods using a ninhydrin reagent. Such methods can also be used to show that the interfering by-products disappear as a result of the present acid treatment. At any rate, the acid treatment can be employed to restore the resolvability of the lysine to that usually obtainable with freshly synthesized DL-lysine.

Aqueous solutions of any of the common strong mineral acids which are inert to lysine under the conditions of use can be employed for the present purpose. Examples are phosphoric, sulfuric and hydrochloric acids, the latter two being preferred. The concentration of the acid in the mixture undergoing treatment generally should be at least 1% by weight in order not to require too long a time. Concentrations ranging from 5 to 45% are preferred. With hydrochloric acid, the concentration is usually less than 37% because the commercial concentrated acid is a 37% solution of hydrogen chloride. The concentration can be increased by addition of anhydrous hydrogen chloride but this is not necessary and does not offer any advantage. With sulfuric and phosphoric acids, concentrations greater than about 50% are best avoided since they may tend to dehydrate the lysine. The amount of acid used will depend somewhat upon the amount of impurities present in the lysine, but as a general rule, from about 1.2 to 8, preferably 1.5 to 5.0 moles of the acid per mole of lysine will be used. Larger amounts can be used but are not usually necessary. Smaller amounts can be beneficial but are not recommended.

The lysine to be mixed with acid prior to the heat treatment is normally in the form of an aqueous solution since it is most conveniently obtained in this form from the cation-exchange resin after racemization. The concentration of the lysine solution is not critical but for practical purposes, it generally will be at least 0.5% and may range up to 70%. Most generally, concentrations from about 5 to 55% will be used. Solid lysine may also be used, if desired, by adding it to the acid solution. When highly concentrated solutions or solid lysine are used with sulfuric or phosphoric acid, it is usually desirable to dilute the acid with water so that a minimum of about 30% water is present in the final mixture of lysine and acid to avoid dehydration of the lysine. The excess of water over 30% will depend on the amount of water to be introduced by the acid and/or lysine solution used and on the concentration of acid and the mole ratio of acid to lysine which are desired. Thus, for example, if it is desired to operate at a 40% concentration of sulfuric acid and 4:1 mole ratio of sulfuric acid to lysine, 40 parts of sulfuric acid (0.41 mole), 15 parts of lysine (0.10 mole) and 45 parts of water will be used. Throughout this description and the claims, the concentration of acid refers to the amount of acid added, calculated as percent by weight of the total mixture.

The treatment with the mineral acid can be carried out at temperatures over a wide range, e. g., from about 70 to 220° C. Since lysine may tend to decompose at temperatures above about 220° C., and since the reaction proceeds quite slowly at temperatures below about 70° C., such higher and lower temperatures are not recommended. Temperatures in the range 100 to 190° C. are preferred.

The time of the treatment will depend in part upon the amount of impurities present in the lysine being treated and the degree of purification desired. Under the preferred temperature conditions, substantial beneficial effects may be obtained in a time as short as about 0.5 hour, but the duration of the treatment generally will range from about 1 to 24 hours. In general, the higher the temperature the shorter will be the time required. Prolongation of the heating beyond the time required for maximum benefit usually is not harmful but also results in no added advantage.

The invention is illustrated by the following examples in which all parts and percentages are by weight unless otherwise indicated.

Example 1

An aqueous lysine solution, 240 parts, containing 98.5 parts of lysine which had been racemized a number of times by the method of Patent 2,536,360, was mixed with 240 parts of a 37% aqueous hydrochloric acid solution and the mixture was heated for 22 hours under reflux (about 110° C.). The mixture was then cooled, diluted with 1400 parts of water, and neutralized to pH 6 by addition of a weakly basic (amine type) anion-exchange resin with stirring. After filtering off the anion-exchange resin, the lysine in the filtrate was adsorbed on a tower of a cation-exchange resin (a sulfonated polystyrene-divinyl benzene copolymer), then eluted from the tower with 20% aqueous ammonia. The eluate was boiled to free it of ammonia and to concentrate it to 193 parts containing 93.5 parts of lysine.

The lysine treated as above was resolved by fractionally crystallizing L-lysine L-glutamate at 60° C. during 8 hours from a resolution mixture of 73 parts (0.5 mole) of the lysine, 70 parts (0.476 mole) of L-glutamic acid, 161 parts of water, 463 parts of methanol and 1 part of L-lysine L-glutamate seed crystals. After washing with 76% methanol, the L-lysine L-glutamate fraction (50 parts) represented a 63% conversion based upon the L-lysine present in the DL-lysine used.

Example 2

Using a solution of racemized lysine from the same stock as that for Example 1, the procedure of Example 1 was repeated except that the mixture of the lysine solution and hydrochloric acid was heated in sealed Carius tubes for 3 hours at 185° C. In this instance, the resolution conversion was 77%.

Example 3

When racemized lysine from the same stock as that for Example 1 was resolved under the same conditions except that the acid pretreatment was omitted, resolution conversions of 22 to 25% were obtained. When freshly synthesized DL-lysine (which had never been racemized) is resolved under the same conditions, resolution conversions of 70 to 77% are obtained.

The results of the above examples show clearly that the present acid pretreatment of lysine which has been repeatedly racemized by the method of Patent 2,536,360 (so as to contain byproduct impurities which interfere with the resolution of the lysine) beneficially affects subsequent resolution of the treated lysine.

The present acid treatment can be carried out beneficially in conjunction with operations for producing lysine by the acid hydrolysis of lysine-yielding intermediates. Examples of such intermediates are poly-3,5-tetramethylene hydantoin, disclosed in Scott et al. U. S. Patent 2,498,300; and 5-(delta-aminobutyl) hydantoin, disclosed in Rogers U. S. Patent 2,564,649. Such intermediates are hydrolyzed by means of mineral acids under substantially the same conditions which are effective for the present acid treatment of racemized lysine. Consequently, in instances where DL-lysine is being produced by the acid hydrolysis of such intermediates, the present acid treatment of racemized lysine can be carried out effectively, as has been found to be the case, by simply recycling the racemized lysine which is to be acid-treated to the vessel in which hydrolysis of the lysine-yielding intermediate is carried out. By so doing, hydrolysis of the lysine intermediate and acid treatment of the racemized lysine are effected simultaneously in a single reaction vessel.

I claim:

1. A method of purifying lysine which has been racemized by heating in combination with a cation-exchange material whereby to improve the resolvability of said lysine, comprising heating at a temperature in the range 70 to 220° C. an aqueous mixture of said lysine and at least 1%, based upon the weight of the resulting mixture, of a mineral acid of the group consisting of hydrochloric acid, sulfuric acid and phosphoric acid.

2. The method of claim 1 wherein the mixture heated contains from 1.2 to 8 moles of the mineral acid per mole of lysine and the mineral acid concentration in the mixture is in the range 5 to 45%.

3. The method of claim 2 wherein the mixture is heated to a temperature in the range 100 to 190° C.

4. The method of claim 2 wherein the mineral acid is hydrochloric acid.

5. The method of claim 2 wherein the mineral acid is sulfuric acid.

References Cited in the file of this patent

UNITED STATES PATENTS

| | | |
|---|---|---|
| 2,498,300 | Scott | Feb. 21, 1950 |
| 2,536,360 | Emmick et al. | Jan. 2, 1951 |
| 2,564,649 | Rogers | Aug. 14, 1951 |
| 2,586,154 | Emmick | Feb. 19, 1952 |